US008326590B2

(12) United States Patent
Kock et al.

(10) Patent No.: US 8,326,590 B2

(45) Date of Patent: Dec. 4, 2012

(54) METHOD AND SYSTEM FOR DESIGNING AND CHECKING SAFETY ZONES OF A ROBOT

(75) Inventors: Soenke Kock, Vaesteras (SE); Adam Loeschner, Vienna (AT); Christoph Winterhalter, Bad Nauheim (DE); Kevin Behnisch, Bad Nauheim (DE); Roland Krieger, Ladenburg (DE)

(73) Assignee: ABB Technology AG, Zurich (CH)

( * ) Notice: Subject to any disclaimer, the term of this patent is extended or adjusted under 35 U.S.C. 154(b) by 897 days.

(21) Appl. No.: 12/443,582

(22) PCT Filed: Sep. 28, 2007

(86) PCT No.: PCT/EP2007/008468

§ 371 (c)(1), (2), (4) Date: Mar. 30, 2009

(87) PCT Pub. No.: WO2008/037491

PCT Pub. Date: Apr. 3, 2008

(65) Prior Publication Data

US 2009/0319081 A1 Dec. 24, 2009

(30) Foreign Application Priority Data

Sep. 30, 2006 (EP) .................................... 06020663

(51) Int. Cl.
*G06G 7/48* (2006.01)

(52) U.S. Cl. .................. 703/8; 901/14; 901/15; 901/16; 901/17; 901/18

(58) Field of Classification Search ... 703/8; 901/14–18
See application file for complete search history.

(56) References Cited

U.S. PATENT DOCUMENTS

| | | | | |
|---|---|---|---|---|
| 7,298,385 | B2 * | 11/2007 | Kazi et al. | 345/633 |
| 8,166,504 | B2 | 4/2012 | Kang et al. | |
| 2003/0225479 | A1 * | 12/2003 | Waled | 700/245 |

FOREIGN PATENT DOCUMENTS

| | | |
|---|---|---|
| DE | 10226140 | 1/2004 |
| DE | 10361132 | 1/2005 |
| DE | 102005011143 | 9/2006 |
| EP | 1332841 | 8/2003 |

OTHER PUBLICATIONS

International Search Report for International No. PCT/EP2007/008468 mailed on Dec. 10, 2007.

* cited by examiner

*Primary Examiner* — Dwin M Craig
(74) *Attorney, Agent, or Firm* — Leydig, Voit & Mayer, Ltd.

(57) ABSTRACT

A method for simulating a movement zone of a robot having at least one data processing installation, simulating at least one movement path of the robot, comprises providing a number of selectable points on the at least one movement path of the robot, calculating a braking path for each of the selectable points, calculating a virtual movement zone based on the braking paths and a maximum position reachable by the robot for the respective at least one movement path, and carrying out the simulation of functions of the robot off-line using a software module.

19 Claims, 3 Drawing Sheets

METHOD AND SYSTEM FOR DESIGNING AND CHECKING SAFETY ZONES OF A ROBOT

This is a U.S. National Phase Application under U.S.C. §371 of International Application No. PCT/EP2007/008468, filed on Sep. 28, 2007, which claims priority to European Application No. EP 06020663.8, filed on Sep. 30, 2006. The International Application was published in German on Apr. 3, 2008 as WO 2008/037491.

The invention relates to a method for simplifying the design and checking of safety zones for protection of the movement zone of a robot having a data processing installation and having a control module, wherein a movement path, and the stopping path of the robot, are simulated at the same time thereby. The invention also relates to a system for carrying out the simulation method.

BACKGROUND

It is generally known that the movements of a robot result in a hazard to people who are located in an unprotected area within range of the robot, and which hazard is kept as low as possible by various technical measures. For example, in addition to having a robot control system, a robot also has a safety control system which monitors specific safety parameters for the robot. For example, the degrees of freedom for the robot movement, in particular, can be defined by a value restriction for one or more of the robot axes. It is also generally known for manual safety zones, for example fences or walls, to be fitted such that the robot in any case moves within the safety zone, in particular by erecting the fences outside the maximum area which can be reached by the robot.

SUMMARY OF THE INVENTION

In some cases, the safety zones are also established with the aid of so-called off-line simulations, that is to say movement simulations of a robot.

An aspect of the invention is to provide a method and a system for simulation of a movement zone of a robot, which makes it possible to calculate the movements, in particular the braking paths, of the robot, also referred to as run-on paths.

A method of the type mentioned initially is accordingly characterized in that a preferably virtual safety control module is used to calculate a braking path for each of a number of selectable points on the movement path of a robot, and in that a virtual movement zone is calculated, which takes account of the braking paths and takes account of the maximum position which can be reached by the robot for that movement path. The expression virtual should be understood as meaning that this does not relate to an actual safety control module but to a software module which carries out the function of the actual appliance and simulates the stopping behavior of the robot in a data processing installation.

In this way, the braking path of the robot is also taken into account when calculating its movement zone. The expression braking path should be understood as meaning the stopping path of the robot from movement to a speed of zero, in which case the robot can act on the programmed path by means of mechanical brakes, uncontrolled electrical motor brake or else controlled deceleration. Finally, there is also a hazard potential for the three-dimensional zone which a robot requires to be braked from its movement to rest. This means that the simulation takes account not only of the movement path itself but also of the "dynamic component", specifically the movement of the robot itself from the stop command from the robot control system until the robot comes to rest. The result of the simulation is the actual maximum three-dimensional zone which can be reached by the robot for a movement path. The simulation can differ in an appropriate manner depending on the movement path and the velocity which the robot reaches at the individual movement points. In any case, however, this means that the virtual movement zone obtained in this way is better than that obtained in previously known simulations which are based on a "geometric" model of the pure movement path itself.

The accuracy of the method according to the invention is further enhanced if the braking path is calculated taking account of the space requirement and/or the position and/or the orientation of the tool used at the selected point.

The virtual movement zone can vary as appropriate depending on the geometry of the tool and other physical constraints. To this extent, the accuracy of the simulation is enhanced by taking account of these physical constraints in the calculation of the virtual movement zone.

A development of the method according to the invention provides that a safety zone which cannot be reached by the robot is defined and, at least in places, is at a distance from the virtual movement zone.

This results in a safety zone being found in a particularly simple manner, which ensures that objects or people who are located in this zone are at no risk from the robot.

It is also envisaged that a collision test be carried out between the movement zone and the safety zone.

In the case of a predetermined safety zone, this allows tests to be carried out, for example by means of physical presets or on the basis of an already existing safety zone, to determine whether the movement zone actually precludes entry into the safety zone.

In one advantageous refinement of the method according to the invention, the safety zone and/or the movement zone are/is displayed on a display apparatus. In the same way, the movement path and/or the braking path and/or the position of the robot which results when the robot is at rest after a braking process can be displayed on the display apparatus.

The results of the calculation are displayed particularly advantageously by a visualization, in such a way that, so to speak, the results can be seen "at a glance", with the check being made unnecessary by the movement program being carried out by the robot.

Accordingly, a system for simulation of a movement zone of a robot having a data processing installation and having a control module for controlling the movement processes of the robot, is characterized in that a safety control module interacts with the control module, in that the safety control module can be used to calculate a braking path for each of a number of selectable points on the movement path of the robot, and in that the safety control module can be used to calculate a virtual movement zone, which takes account of the braking paths and takes account of the maximum area which can be reached by the robot for that movement path.

The braking paths are taken into account by a safety control module which interacts with the already-known control module. Consideration of the braking paths essentially results in a more realistic calculation of the movement zone of a robot in the situation in which the safety devices of the robot act and said robot must be brought to rest. This considerably improves the simulation result.

For overall consideration of the movement processes and of the required movement zone of the robot, the virtual movement zone is calculated by the safety control module having the capability to calculate a position at which the robot will be at rest after the braking process.

A further advantage is that the system operates "off-line", that is to say characterized in that the control module and/or the safety control module are/is implemented in the data processing installation.

This makes it possible to make fundamental stipulations, for example for the safety zone for the actual robot. Stipulations or amended stipulations can also be handled by loading or resetting, tests of safety zones in the simulation with the aid of the virtual safety control system, if appropriate modification, storage, and data export of the safety-related data to the actual safety control system.

A further advantage of the invention is that the operator is provided with a visual impression of how the programmed path and velocity are affecting the position and size of the safety zones which can be defined in order, if appropriate, to optimize the position and size of the safety zones by modification of the robot movement in order, for example, to minimize the area required for robot installation. This results in a cost advantage for the operator of the robot installation.

BRIEF DESCRIPTION OF THE DRAWINGS

The invention, its advantages and further improvements of the invention will be explained in more detail with reference to the exemplary embodiments which are illustrated in the drawings, in which.

DETAILED DESCRIPTION OF THE DRAWINGS

Figure 1:
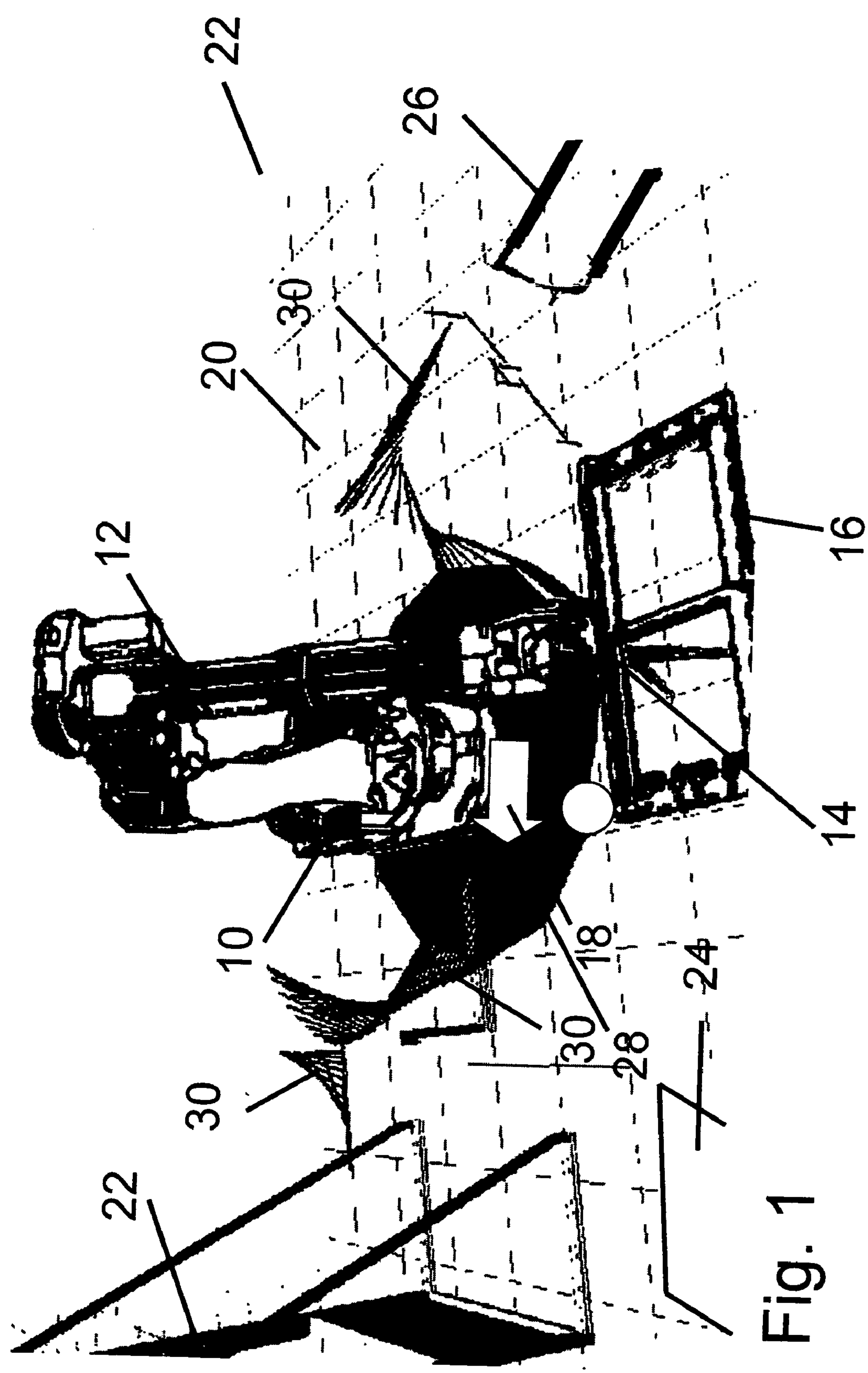
FIG. 1 shows an illustration of a simulation result for a movement zone.

FIG. 1 shows an illustration, in the form of a graphic, of a simulation of a movement zone on a display apparatus, for example a screen of a computer system. The movement zone of a robot 10 with a robot arm 12 which is fitted on a workpiece mount 16 at a tool connection point 14 was considered in this case. The robot 10 is designed to follow a specific procedure, that is to say a predetermined movement path, in accordance with a movement program which is stored in the robot control system. In this case, the movements of each individual joint of the robot arm 12 and, for example, rotary movements of the robot overall, are predetermined exactly. An arrow 18 in this case symbolizes that the robot 10 is moving in the direction indicated by the arrow, and the illustration is just a record of one moment during this movement. A floor area 20 on which the robot 10 is standing is indicated by a grid network, while a boundary of the safety zone is represented by partition walls 22. Furthermore, a tool table 24 and a welding tool 26 are illustrated which are the working zones which can be reached by the robot 10 and are arranged such that the robot 10 can move the workpiece 16 backwards and forwards as desired between the tool table 24 and the welding tool 26.

This illustration also shows a graph 28 which has a multiciplicity of lines 30, with each of these lines 30 representing a path which the robot requires in order to come to rest from a specific point on its movement path, referred to in the following text as braking path. Furthermore, the graph 28 can be interpreted as meaning that the connection between one of the ends of the lines 30 can be regarded as a movement path, while the lines themselves represent the respective braking paths at the various points on the movement path.

The graph 28 illustrates that the safety zone required by the robot 10 taking account of the braking paths may differ from the safety zone which takes account of only the movement path itself This is represented in particular by the "free ends" of the lines 30. The simulated movement zone of the robot 10 therefore represents the zone which can actually be reached by the robot 10 after it has come to rest, at each movement point on the movement path.

If the graph 28 is added to in an expedient manner, this results in a three-dimensional zone which is occupied overall by the robot 10 for the relevant movement path. In this case it is of secondary importance for the result of the simulation whether a two-dimensional representation of the boundary of the safety zone or a three-dimensional representation of the entire spatial zone covered by the robot 10 is chosen as the movement zone for the safety zone.

Figure 2:
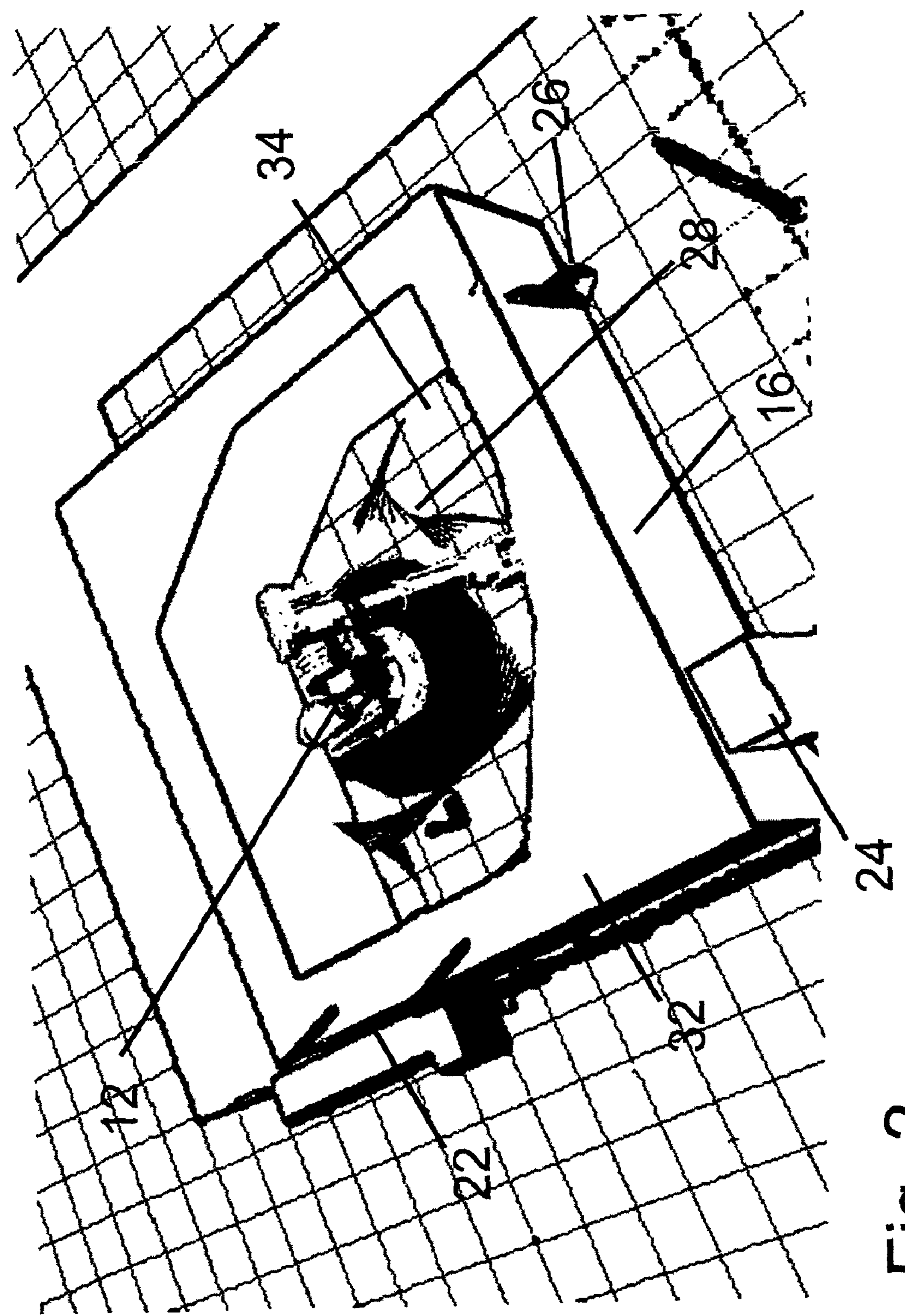
FIG. 2 shows a plan view of a safety zone in which a robot is arranged.

FIG. 2 shows a plan view of a virtual working zone of the robot 12, illustrating a safety zone 32 in which a movement zone 34 is shown which is provided for the movements of the robot 12 to be carried out.

In order to check whether the movement zone 34 has been chosen adequately for the relevant movement path, the graph 28 is shown once again.

Incidentally, the reference symbols for the same components have been transferred from FIG. 1.

Figure 3:
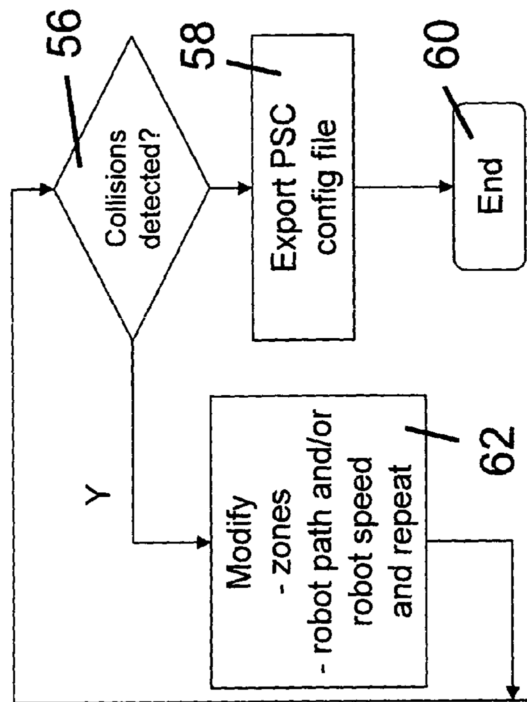
FIG. 3 shows a flowchart for a method for simulation of a movement zone.
Figure 3:
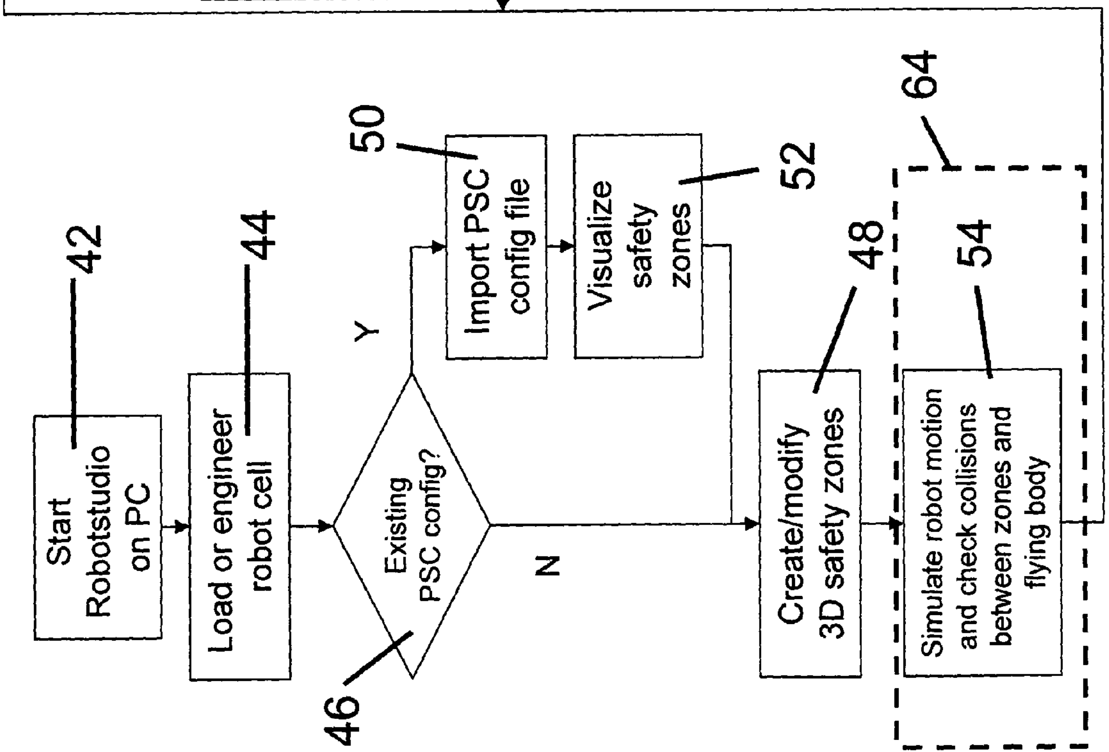

By way of example, FIG. 3 shows a procedure for a method for simulation of a movement zone of a robot.

In this case, first of all, a simulation program for a robot is started in a first method step, on a data processing installation, in this case the "robot studio" from the ABB Company. A program such as this has a plurality of modules, inter alia a control module which represents a virtual robot control system and by means of which an actual robot control can be simulated "off-line", that is to say outside the actual robot control system, or at least without the robot carrying out movements. In the chosen example, the robot studio runs on a universal data processing installation, for example a desktop computer or laptop.

In a second method step 44, the program either loads an existing virtual robot cell from a database, or the program provides a module which allows the creation of a robot cell such as this.

In a third method step 46, configuration data record for a safety control system (PSC) is allocated to a robot cell which has been selected or created. This can be done in two ways. Either a PSC configuration file will have already been allocated to that robot cell, which means that it is possible to move directly to a fourth method step 48, or the PSC configuration file is imported from a corresponding database in a fifth method step 50, in which case it is possible, in a sixth method step, to display the safety zones on an appropriate display apparatus, for example a screen, before importation of the PSC configuration file.

Existing three-dimensional safety zones are now modified, created or if appropriate just confirmed as well, in the fourth method step 48.

In a seventh method step 54, the robot movement is now simulated on the movement path and, furthermore, a safety control module, as a computer program product of the robot studio, also takes account of the respective braking path at the individual selected path points of the robot. This data now makes it possible to check for any collision between the safety zone and the maximum position which can be reached by the robot. In the chosen example, even the tool of the robot is taken into account, in this case as a so-called "flying body", with the corresponding spatial dimensions. This is because this "flying body" must also not enter the safety zone of the robot. A "flying body" provides a graphical representation of the position of the tool, or at least of a point on the tool, at the theoretical stopping point in the event of emergency stopping of the robot.

The check for a collision between the safety zone and the robot position has two possible results and is carried out in an eighth method step 56, which can either have the result that no collision is detected, as a result of which the configuration data is exported in a ninth method step 58, for example by being stored in a database or being transferred directly to a robot control system. In this situation, the method is ended in a tenth method step 60.

In the opposite situation, specifically in which a collision is detected between the safety zone and robot position in the eight method step 56, a jump is made in an eleventh method step 62 back to a program item in which it is possible to adapt either the safety zones and/or the movement path of the robot and/or the robot velocity, and the collision check can be repeated using the constraints that have been modified in this way.

In the chosen example, only the seventh method step 54 is in the form of a specific program module, specifically the safety control module 64. The module essentially simulates the safety control system provided in the actual robot.

In this way, it is also possible to tell how the system according to the application can be implemented for simulation of a movement zone of a robot, using any universal data processing installation, as in the example. The control module 64 therefore contains two individual modules, specifically the control module which simulates the movement of the robot, as well as a safety control module which calculates a braking path for each of a number of selectable points on the movement path of the robot. These can then be used for calculation of the visual movement zone for the robot.

The invention claimed is:

1. A method for simulating a movement zone of a robot having at least one data processing installation, simulating at least one movement path of the robot, comprising:
- providing a number of selectable points on the at least one movement path of the robot;
- calculating a braking path for each of the selectable points, each braking path differing from the at least one movement path and connecting a point on the at least one movement path to a stationary point;
- calculating a virtual movement zone based on the braking paths corresponding to each of the selectable points on the at least one movement path of the robot and including a maximum position reachable by the robot for the respective at least one movement path; and
- carrying out the simulation of functions of the robot offline using a software module.

2. The method as recited in claim 1, wherein the calculating of the braking path includes calculating a rest position of the robot after a braking process.

3. The method as recited in claim 2, wherein the calculating of the braking path is performed taking into account an instantaneous velocity at a selected point.

4. The method as recited in claim 3, wherein the calculating of the braking path takes into account at least one of a space requirement, a position, and an orientation of a tool used at the selected point.

5. The method as recited in claim 4, further comprising defining a safety zone unreachable by the robot and disposed at a distance, at least in places, from the virtual movement zone.

6. The method as recited in claim 5, further comprising carrying out a collision test between the movement zone or at least one rest position and the safety zone.

7. The method as recited in claim 6, further comprising displaying at least one of the safety zone, the movement zone, and the rest position on a display apparatus.

8. The method as recited in claim 7, further comprising displaying at least one of the movement path, the braking path, and the rest position of the robot on the display apparatus.

9. The method as recited in claim 2, further comprising providing the safety zone to a robot control system using the data processing installation.

10. A system for simulating a movement zone of a robot, the system comprising:
- at least one data processing installation having a control module implemented in a non-transitory memory of the processing installation for controlling the movement processes of the robot, and
- a safety control module interacting with the control module, the safety control module being configured to calculate a braking path for each of a number of selectable points on a movement path of the robot, each braking path differing from the movement path and connecting a point on the movement path to a stationary point and being configured to calculate a virtual movement zone taking into account the braking paths corresponding to each of the selectable points on the movement path of the robot and including a maximum area reachable by the robot for the respective movement path.

11. The system as recited in claim 10, wherein the safety control module is integrated in the control module.

12. The system as recited in claim 10, wherein the safety control module is configured to calculate a resting position of the robot after a braking process.

13. The system as recited in claim 10, wherein the movement zone has a two-dimensional or three-dimensional shape connecting a plurality of calculation positions.

14. The system as recited in claim 10, wherein at least one of the control module and the safety control module is a program product.

15. The system as recited in claim 10, wherein at least one of the control module and the safety control module is implemented in a first data processing installation.

16. The system as recited in claim 15, further comprising a second data processing installation configured to perform the simulation.

17. The system as recited in claim 10, wherein the at least one data processing installation includes a robot control system or simulates a robot control system.

18. The system as recited in claim 10, wherein at least one of the robot, the control module, and the safety control module is a virtual object in a simulation program.

19. The system as recited in claim 10, wherein the system is configured to export data between the robot control system and the at least one data processing installation.

* * * * *